United States Patent [19]
Ruppert et al.

[11] Patent Number: 5,827,467
[45] Date of Patent: *Oct. 27, 1998

[54] METHOD AND APPARATUS FOR FORMING FLANGES ON TUBES

[76] Inventors: Hans-Peter Ruppert, Gottfried-Kinkel - Strasse 5, 65187 Wiesbaden; Ernst Wendorff, Waldstrasse 1, 65232 Taunusstein, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 498,222

[22] Filed: Jul. 5, 1995

[30] Foreign Application Priority Data

Jul. 4, 1994 [DE] Germany .......................... 44 23 372.8

[51] Int. Cl.⁶ .................................................. B29C 57/04
[52] U.S. Cl. .......................... 264/322; 264/296; 264/327; 425/384; 425/393
[58] Field of Search .................................. 264/296, 322, 264/327; 425/393, 384

[56] References Cited

U.S. PATENT DOCUMENTS

| | | |
|---|---|---|
| 3,584,344 | 6/1971 | Bjalme ..................................... 425/393 |
| 3,843,300 | 10/1974 | McFarlane ............................... 425/384 |
| 3,929,958 | 12/1975 | Parmann ................................. 264/322 |
| 4,059,379 | 11/1977 | Korff et al. ............................. 264/322 |
| 4,113,813 | 9/1978 | Wilson .................................... 264/322 |
| 4,140,739 | 2/1979 | Cotten .................................... 264/322 |
| 4,156,710 | 5/1979 | Carroll et al. .......................... 264/322 |
| 4,406,852 | 9/1983 | Riegel .................................... 264/322 |
| 4,867,929 | 9/1989 | Albrecht et al. ........................ 264/322 |
| 4,907,958 | 3/1990 | Jones ...................................... 425/393 |
| 4,975,234 | 12/1990 | Parmann ................................. 264/322 |

FOREIGN PATENT DOCUMENTS

| | | |
|---|---|---|
| 420472 | 8/1974 | U.S.S.R. ................................ 264/322 |
| 895444 | 5/1962 | United Kingdom ................... 264/322 |

*Primary Examiner*—Jan H. Silbaugh
*Assistant Examiner*—Mark Eashoo
*Attorney, Agent, or Firm*—Gifford, Krass, Groh, Sprinkle, Patmore, Anderson & Citkowski, P.C.

[57] ABSTRACT

Method and apparatus for forming flanges and tubes of partical crystalline thermoplastics. The thermoplastics may comprise cross-linked portions and preferably are polyethylene. A heated tube end (2) is upset in a die (10) by a plunger (30) so as to arch and form a pair of conical regions which become disk-shaped and are folded together to form the flange (8).

6 Claims, 1 Drawing Sheet

METHOD AND APPARATUS FOR FORMING FLANGES ON TUBES

FIELD OF INVENTION

The invention relates to a method and an apparatus for forming flanges on tubes made of non-cross-linked and cross-linked thermoplastics and particularly of polyolefines and most preferably of polyethylene.

BACKGROUND OF INVENTION

Production of flanges of thermoplastic tubes by arching and folding the tube wall is known from the teaching of French patent no. 1,257,165. Outer supporting bushings for the thermoplastic tube are used so that a region is unsupported where the flange is to be formed. In this unsupported region, the tube wall is arched outwardly when the bushings are moved toward one another axially. For the operation, the thermoplastic tube may be heated from the interior. A disadvantage of this method is that an endpiece of the tube must be cut away, if the flange is to be at the end of the tube. A further disadvantage is the fact that when upsetting the material, it does not always arch outwardly so that faulty flanges are obtained.

To avoid this last disadvantage, French patent no. 2,582,568 teaches the use of pressurized air to act in the heated zone in order to insure that the tube arches outwardly. As before, an endpiece of the tube remains at the flange.

This disadvantage can be avoided by the teaching of the German patent 1,177,800 which introduces a guiding tube into the thermoplastic tube which is to carry the flange and by supplying hot pressure gas to the endpiece of the thermoplastic tube being compressed between an anvil wall and a pressure plate. The rate of the supplying heat by hot pressure gas is difficult to control.

It is also known to arch the tube wall by a spreading mandrell, see German patent no. 3,920,814. In such a method; much machinery is needed.

Certain thermoplastics, particularly polyolefines, may be cross-linked so as to show a characteristic which is between a thermoplastics and a thermoset. For many applications, cross-linked polyethylene having a cross-linking of 75 percent is desirable for use and is on the market according to the standard DIN 16892. In a preferred form of the invention, large or, so-called flange disks, are to be formed. Tubes provided with such flange disks may be mounted on boilers, valves or other standard flanges by standard coupling plates which are called "loose flanges".

OBJECTS OF THE INVENTION

It is an object of the invention to provide a method for forming flanges on tubes made up of thermoplastics which may include crossed-linked thermoplastics.

It is another object of the invention to provide a method for forming flanges which are relatively large on thermoplastic tubes.

It is a further object of the invention to use a method which can be used with cross-linked thermoplastics.

It is a further object of the invention to provide light weight apparatus for forming flanges onto tubes.

Another object of the invention is to provide an apparatus for forming flanges onto tubes which is simple in structure and may be easily transported in the field.

SUMMARY OF THE INVENTION

With the invention, a tube with a suitable cut end is provided, for example in the field. A predetermined length of the tube is clamped a a predetermined distance from the tube end so as to create a cantilever section. This cantilever section and the intermediate portion of the clamped tube are heated to the softening temperature of the partial crystalline thermoplastics. Thereafter, the cantilever section is upset axially so as to arch the cantilever section in its central region and to form a pair of annular disks which are connected to one another. The radial outer regions of the disks are cooled so as to quickly cause partial crystallization of the thermoplastics and to stabilize the flanges so produced.

The apparatus includes a divisible die of shells fitting one upon the other which define a narrow diameter section and a large diameter section, the narrow diameter section being dimensioned for clamping the tube—also with a view to the heating and thermal expansion thereof—and the large diameter section being adapted to accomodate the cantilever portion and to form the flange to be produced. The heating means include a moveable head adapted to heat the tube from the interior and the exterior. The heated tube length corresponds, at the outer side thereof, to the double flange length and, from the interior side thereof, to somewhat more than the double flange length. The heating head is moveable, that is, will be removed from the cantilever portion so as to give space for a plunger which can be driven axially. The plunger preferably has a narrower diameter section which has a smaller diameter than the inner diameter of the tube and a larger diameter section corresponding to the outer diameter of the flange to be produced, and is subdivided into a non-cooling surface region and a cooling surface region, the non-cooling surface region having such a temperature or such a low thermal conductivity that the thermoplastic is heated to softening temperature does not show partial crystallization at its surfaces in engagement with these non-cooling surface regions of the plunger whereas at the surfaces in engagement with the cooling surface regions of the plunger, a quick lowering of the temperature of the thermoplastic to partial crystalline conditions is created. This step makes it possible to withdraw the step plunger relatively quickly after a working stroke and to leave a flange which is sufficiently stabilized which therefore can cool in the air and take its useful condition. As indicated, this can be carried out in the field, that is, onto a tube which is already installed. Tube length can be fed from tube stock and installed within pits or air wells or in other tubes, whereupon a flange is formed onto the cut end of the tube length. Also, an intermediate length and a fitting length may be produced. Certainly, the flanges also can be produced on the tube in a workshop. In any case, low costs of the apparatus and its small size are an advantage. The divisible die for clamping the tube end may be very simple and does not need to be provided with cooling water. As a heating means, a commercial hand-held warm air ventilator can be used, the moveable heating head being mounted to the front end thereof. There are several moveable heating heads for the different diameter sizes of the tubes, all being very simple devices. The plunger may mainly comprise plastic and a ring of metal so as to cool the periphery of the flange to be produced after having engaged same. According to circumstances, the plunger may be driven by a screw spindle or pneumatically or hydraulically by a piston. The apparatus as such remains simple.

BRIEF DESCRIPTION OF THE DRAWINGS

Further details are shown in the drawings wherein.

DETAILED DESCRIPTION

Figure 1:
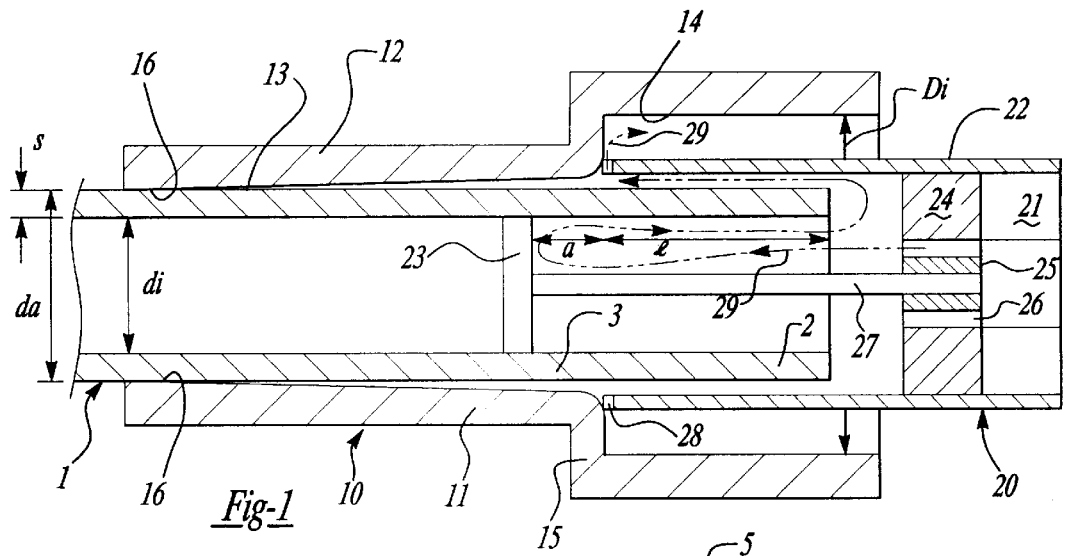
FIG. 1 is a sectional view of a clamped end of a tube having a heating head mounted thereon.

Referring to FIG. 1, a tube 1 of cross-linked polyethylene is clamped in a die 10 which is divisible. The die 10 is made up for example of two shells or halves 11, 12 which, when mounted together, define a small diameter section 13 and a large diameter section 14 of tube sleeves which are connected through semi-circular walls forming a collar 15. The sleeve of the small diameter section 13 has an engagement portion 16 which is smooth or grooved and is arranged adjacent to the outer end of the narrow diameter section 13. The diameter within the narrow diameter section 13 increases, as seen from the engagement place 16, to the collar 15 so as to accomodate thermal expansions of the tube 1. The length of the sleeve and of the narrow diameter section 13 is not critical and is for instance the three-fold of the diameter of the tube 1 where da is the outer diameter, di is the inner diameter and s is the thickness of the wall.

The divisible die 10 has an inner diameter Di in the large diameter section 14 corresponding to the outer diameter of the flange to be produced. The axial length of the large diameter section 14 is somewhat more than the value Di minus da. As can be seen, the tube 1 is clamped within the die 10 so that it cantilevers by the length l into the large diameter section 14. This length corresponds to the value of Di minus di minus s.

As shown, the cantilever section 2 is encompassed by a heating head 20 which may be connected to a warm air heater (not shown) and therefore has coupling means 21, an outer sleeve 22 and a baffle plate 23. A baffle plate holder 24 is arranged within the sleeve 22 adjacent to the coupling half means 21 and includes a hub 25 having air passages 26. A rod 27 is fixed to the hub 25, and the baffle plate 23 is mounted to the free end of the rod 27. At the front end of the sleeve 22, a plurality of passages 28 is provided for the air and can be formed as half-circular recesses in the forward rim of the sleeve 22. As shown, the baffle plate 23 extends by the length a beyond the front rim of the sleeve 22 so that the tube 1 can be heated in its interior also in the transition region of the clamped portion to the cantilever portion 2. Arrow 29 indicates the flow of air heating the cantilever portion 2 and the transition portion 3.

The heating temperature is chosen depending upon the cross-link thermoplastic from which the tube wall 1 exists. The invention particularly is suitable for cross-linked partial crystalline polyethylene known also as hard polyethylene. Such material is heated up to 135° through 140° C. where the partial crystalline condition disappears, and the material which was previously opaque becomes transparent clear. In this condition, hard polyethylene may be deformed easily, and the new shape can be frozen by decreasing the temperature thereof. It should be observed, however, that the long-chained cross-linked thermoplastic has memory of its original shape and tends to go back to that shape. As will be explained, this tendency is counteracted by the invention.

Figure 2:
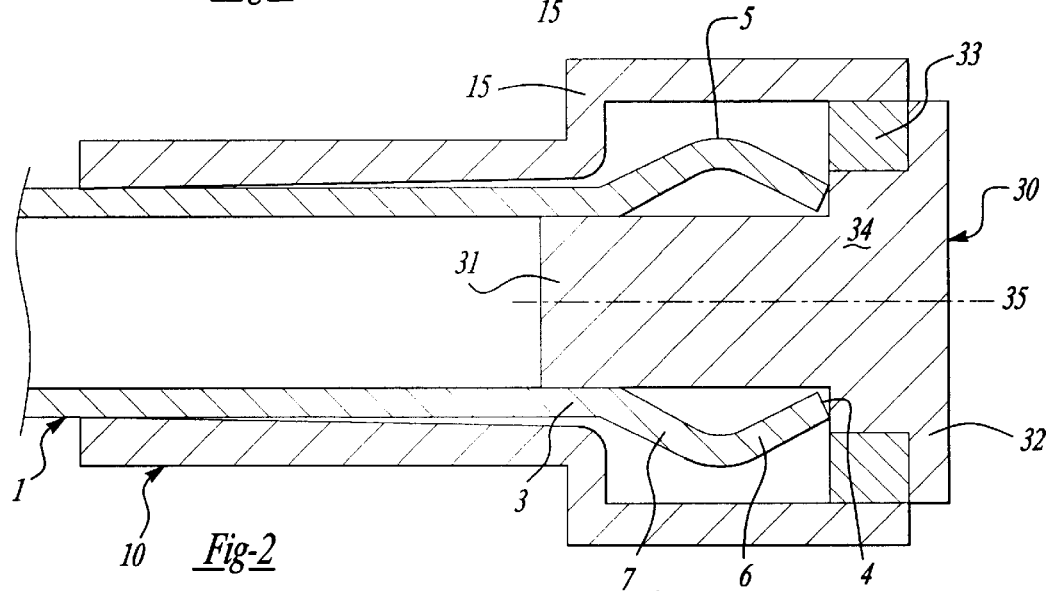
FIG. 2 is the clamped end of the tube being deformed by a stepped plunger.

The heating head 20 is removed from the tube 1, and instead thereof a stepped plunger 30 is inserted into the cantilever portion 2 (see FIG. 2). The stepped plunger 30 comprises a narrow diameter section 31 corresponding to the inner diameter di of the tube 1 and a larger diameter section 32 corresponding to the larger diameter section DI of the die 10 or the outer diameter of the flange to be produced. The stepped plunger 30 is mainly made up of material of low thermal conductivity, that is, synthetics, and a small annular region 33 of a thermal conductive material, i.e. metal. The rim 33 is arranged at the inner side of the large diameter section 32 and radially outwardly thereof. The stepped plunger 30 is engaged in the annular transition zone 34 between the narrow and the wide diameter sections by the cut end 4 of the tube 1 when the plunger travels to the left in the drawing. The plunger can be driven in different ways. For example, a splindle drive by hand is feasible where hook-shaped holders are supported at the collar 15 so as to support the spindle extending along the axis 35 against the resistance of the step plunger 30. For driving the plunger 30, also a pneumatically or hydraulically driven piston rod can be used.

Figure 3:
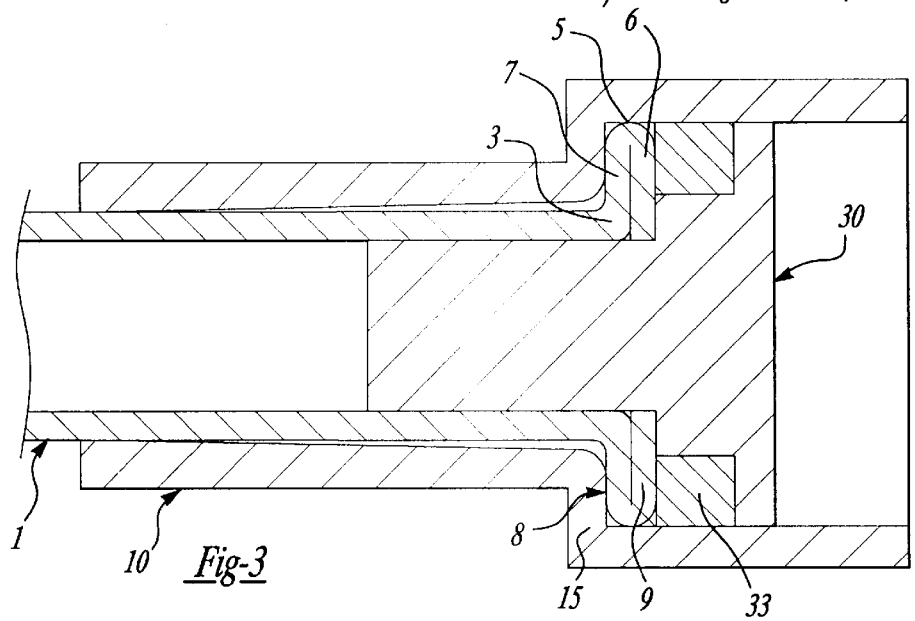
FIG. 3 is the clamped tube end with finished flange.

The plunger 30 acts to upset the cantilever portion 2 so that the latter is arching in its central region 5 and finally buckles outwardly so as to create two conical regions 6 and 7 which get steeper and steeper during travel of the plunger and finally extend as radial disks as shown in FIG. 3. The disks 6 and 7 are pressed together and bond at least partially as at 9 to form the flange 8. Since the region 3 of the tube 1 has been heated adequately, a proper bending is formed at the radial inner end of the disk 7. Such shape is important for avoiding weakening of the flange 8 at its root.

Comparing FIGS. 2 and 3, the outer sides of the disks 6 and 7, and the collar 15 of the die 10 engage one another only in the last phase of the plunger movement. At least the collar 15 of the die is made up of metal. Accordingly, the disks 6 and 7, which are at a higher temperature, engage cooling metallic surfaces 15 and 33 only at the end of the plunger stroke whereby heat is drawn off the flange 8 just formed, mainly from the radial outer zones. In this manner, re-crystallization of the thermoplastic material occurs zone by zone from outwardly to inwardly, and the flange 8 stabilizes. After removal of the plunger 30 and the die 10, the flange 8 so produced stays in the radial plane, that is, has no tendency to develop a gap at place 9 and to take a conical shape.

The method of invention has the advantage of providing a wide choice of shapes for the flange 8. Therefore, also flange sizes can be produced where coupling plates (the so-called loose flanges) of the standard DIN 2642 can be used. This means, connecting the flanges in the usual manner is possible.

The method and the apparatus of invention can be modified in several ways. The cantilever portion need not be heated by warm air, other heating means are also feasible, for example by a fluid or by radiation heat. Instead of the stepped plunger, also a simple plunger having a hollow molded shoulder at the engagement point with the cut end of the tube to be worked upon can be used.

The invention can be used also for other cross-linked partial crystalline thermoplastics (besides of cross-linked or hard polyethylene), for example with polypropylene. The correct softening temperature of the material has to be observed where the partial crystalline structure is disappearing. In this condition, the material can be formed, and the shape produced can be fixed by newly partially crystallizing. The method of the invention to produce a pair of disks leads to a stress distribution within these disks which cancel each other so that an extraordinarily good repeat pattern of the produced flange is obtained even though the cross-linked material has been deformed.

The invention can be used with non-cross-linked thermoplastics as well. The partial crystalline thermoplastics is heated to a point until it becomes soft at the end piece 2 of the length 1, and the steps as described in connection with FIGS. 1 through 3 are carried out.

A pair of tubes having flanges 8 formed thereon may be sealingly pressed onto one another by so-called loose flanges or coupling plates. If a larger pressure develops in the hollow of the tubes, the pressure is active between the surfaces 9 and tries to spread the disks one from the other. However, the flanges 8 are pressed together even stronger increasing the tightness of the flange connection.

What is claimed is:

1. A method for forming flanges on tubes of partially crystalline thermoplastics, comprising the steps of:

providing a tube having an inside wall and an outside wall and an end;

clamping a predetermined portion of the tube so that a predetermined length of the tube, between a clamping point and said end, extends free to create a cantilever portion;

providing a heating head, having an outer sleeve, wherein the outer sleeve is disposed over said cantilever portion, said outer sleeve having an inner surface spaced from the outside wall of said tube in said cantilever portion to provide a space therebetween;

said heating head including a plunger disposed within said cantilever portion to limit air flow through an interior of said cantilever portion;

providing a die having an enlarged diameter portion radially outwardly spaced from said heating head and said cantilever portion;

providing heated air to said space and to the interior of said cantilever portion whereby said cantilever portion is heated from inside and outside to heat said inside wall and said outside wall of said tube in said cantilever portion to a softening temperature of the partially crystalline thermoplastic;

axially withdrawing said heating head and said plunger from said cantilever portion when said cantilever portion has reached said softening temperature;

axially upsetting said cantilever portion so as to arch said cantilever portion up into said enlarged portion of said die, thereby forming an axially upset portion;

exerting axial pressure on said axially upset potion of said cantilever portion to form a pair of annular disks abutting each other to form a flange; and cooling a radial outer peripheral portion of the flange by metal contact with said annular disks so as to cause a renewed partial crystallization of the thermoplastic, advancing radially from outward to inward, to stabilize the flange so produced.

2. The method of claim 1 wherein clamping is carried out by a divisible die comprising at least two shells of tube halves having two internal diameter regions which correspond to an outer diameter of said outside wall of the tube and said enlarged diameter portion, respectively joined by an axially extending metal collar.

3. The method of claim 2 wherein cooling is carried out by engagement with a metallic surface of a metal collar of the divisible die and an outer annular metal region of the plunger respectively.

4. The method of claim 1 wherein heating is carried out by heating said outside wall of the tube in said cantilever portion corresponding to said predetermined length and said inside wall of the tube corresponding to a length which is somewhat larger than the cantilever portion.

5. The method of claim 1 wherein said plunger includes an engagement region for said end.

6. A method for forming flanges on tubes of partially crystalline thermoplastics, comprising the steps of:

providing a tube having an inside wall surface, an outside wall surface and a cut end surface;

providing a die having an enlarged diameter portion radially outwardly spaced from said outside wall surface of said tube;

clamping a predetermined portion of said tube so that a predetermined length of the tube, between said predetermined portion and said cut end surface, extends free to create a cantilever portion;

providing a heating head, having an outer sleeve, wherein the outer sleeve is disposed between said enlarged diameter portion and said cantilever portion;

heating said cantilever portion and a transition portion, said transition portion joining said cantilever portion to said predetermined portion, by applying heat to said inside wall surface of said tube in said cantilever portion and said transition portion and to said outside wall surface of said tube in said cantilever portion until a softening temperature of the partially crystalline thermoplastic is reached;

axially upsetting said cantilever portion so as to arch said cantilever portion radially outwardly into a space provided by said enlarged diameter portion thereby forming an outwardly arched portion;

pushing axially against said outwardly arched portion of said cantilever portion to form a pair of annular disks; and cooling a radial outer peripheral portion of said annular disks by metal contact so as to cause a renewed partial crystallization of the thermoplastic, advancing the cooling radially from outward to inward, to stabilize the flange so produced.

* * * * *

UNITED STATES PATENT AND TRADEMARK OFFICE
CERTIFICATE OF CORRECTION

PATENT NO. : 5,827,467
DATED : October 27, 1998
INVENTOR(S) : Hans-Peter Ruppert et al.

It is certified that error appears in the above-identified patent and that said Letters Patent is hereby corrected as shown below:

<u>Title page,</u>
Item [57], ABSTRACT,
Line 2, replace "partical" with -- partially --
Line 3, replace "are" with -- is --.

<u>Column 1,</u>
Line 11, replace "of" with -- on --. (second occurance)
Line 20, after "away" delete -- , --.
Line 36, replace "mandrell," with -- mendrell; --.
Line 44, after "large" insert -- flanges --.
Line 44, replace "or," with -- ,or --.

<u>Column 2,</u>
Line 1, replace "a" with -- at --. (first occurance)

<u>Column 3,</u>
Line 16, replace "place" with -- portions --.
Line 38, replace "is" with -- are --.

Signed and Sealed this

Eighth Day of October, 2002

*Attest:*

JAMES E. ROGAN
*Director of the United States Patent and Trademark Office*

*Attesting Officer*